United States Patent [19]

Yamamuro

[11] Patent Number: 5,051,972
[45] Date of Patent: Sep. 24, 1991

[54] TRACK ACCESSING CONTROL APPARATUS HAVING A HIGH-PASS FILTER FOR EXTRACTING A TRACKING SIGNAL

[75] Inventor: Mikio Yamamuro, Kawasaki, Japan
[73] Assignee: Kabushiki Kaisha Toshiba, Kawasaki, Japan
[21] Appl. No.: 212,551
[22] Filed: Jun. 28, 1988
[30] Foreign Application Priority Data Jun. 30, 1987 [JP] Japan .................... 62-163088

[51] Int. Cl.$^5$ .................................. G11B 7/085
[52] U.S. Cl. ..................... 369/32; 369/44.28; 369/44.32
[58] Field of Search ............. 369/32, 44.28–44.29, 369/44.32, 44.41; 250/201.1; 358/335

[56] References Cited

U.S. PATENT DOCUMENTS

| | | | |
|---|---|---|---|
| 4,663,750 | 5/1987 | Hamanaka et al. | 369/45 |
| 4,677,602 | 6/1987 | Okano et al. | 369/32 |
| 4,695,989 | 9/1987 | Kimoto | 369/44.32 X |
| 4,817,073 | 3/1989 | Suzuki | 369/44.28 |
| 4,837,637 | 6/1989 | Akiyama et al. | 369/32 X |
| 4,868,819 | 9/1989 | Kimura | 369/32 |
| 4,879,707 | 11/1989 | Getrener et al. | 369/44.29 X |
| 4,887,253 | 12/1989 | Tateishi | 369/44.28 X |

FOREIGN PATENT DOCUMENTS 0127845 12/1984 European Pat. Off. De.
3438260A1 5/1985 Fed. Rep. of Germany.
58-55566 12/1973 Japan.

Primary Examiner—Robert L. Richardson
Assistant Examiner—W. R. Young
Attorney, Agent, or Firm—Finnegan, Henderson, Farabow, Garrett and Dunner

[57] ABSTRACT

A tracking accessing control apparatus for a light beam for an optical disk having an information recording track in which an apparatus for directing the light beam directs the light beam onto the optical disk. A light beam reflected from the optical disk is detected and a tracking signal, which has a track detection alternating signal and a low frequency component, is generated. A high-pass filter filters out the low frequency component to leave only the track detection alternating signal. The number of alternations of the track detection alternating signal is counted, and the light beam directing means if moved across the tracks according to the number of alternations counted.

5 Claims, 4 Drawing Sheets

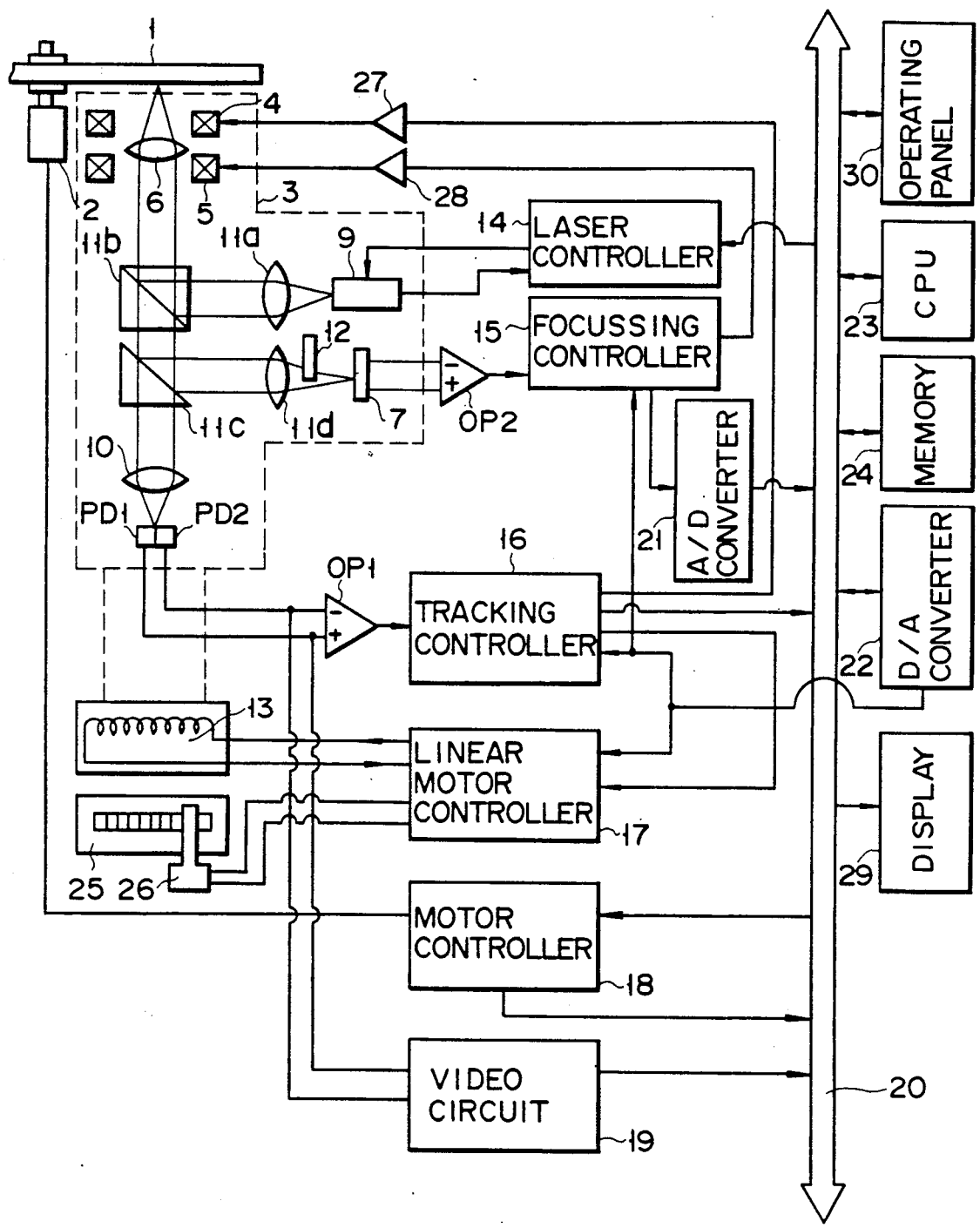
F I G. 1

TRACK ACCESSING CONTROL APPARATUS HAVING A HIGH-PASS FILTER FOR EXTRACTING A TRACKING SIGNAL

BACKGROUND OF THE INVENTION

1. Field of the Invention

This invention relates to an optical information reproducing apparatus and, more particularly, to an optical apparatus capable of exact track access in relation to an optical information reproducing operation.

2. Description of the Related Art

In general, an optical information reproducing apparatus uses an optical pick-up having an objective lens to retrieve information recorded on a circular recording medium known as an optical disc. A plurality of sectors are defined radially on the disc, and a plurality of tracks are formed concentrically thereon. Information is recorded in the form of a pit and a number of pits are formed on each track, the length of each pit differs according to what information is recorded. The operation of reading out or reproducing information recorded on the disc is effected as follows:

First, a laser beam is applied to a preset track position, via the pick-up, and is reflected toward the objective lens. The amount of reflected laser beam varies depending on the presence or absence of a pit. When the laser beam is applied to a position having no pit, an intense reflected light is incident on the objective lens. In contrast, when the laser beam is applied to a pit, the beam diffracts, with the result that part of the reflected light is not transmitted to the objective lens, thus reducing the amount of reflected light incident on the objective lens. Therefore, whether information is on the track is detected from the amount of reflected light.

When information is reproduced by applying a laser beam to the optical disc, it is necessary to control the movement of the optical pick-up or objective lens so that the laser beam can always be applied to a preset pit position in a preset track. Accordingly, when the laser beam spot is caused to deviate from the preset pit position, because of eccentricity of the disc or distortion of the track, a servo system is operated to move the optical pick-up to a position where the pit comes directly under the lens. The above control operation is generally called tracking servo control. Known tracking servo control methods include, the three spots method, the wobbling method, the push-pull method, among others.

Japanese patent publication No. 58-55566 discloses a tracking servo control in which an electrical feedback circuit is provided for controlling a motor device used for shifting a lens, the amount of the shift depending on a voltage supplied from a photoelectric converter which converts light reflected from a track into electrical signals.

During the accessing of a track, the optical pick-up up or objective lens is moved over the disc surface. To determine the position of the pick-up or objective lens after the movement has commenced, information relating to the reference position and the distance travelled by the optical pick-up or objective lens is required. To obtain the information on the distance travelled, the light reflected from the disc is transmitted to photosensors, via the optical pick-up including the objective lens. A tracking signal is derived from a difference between two outputs of the photosensors, and is converted into binary form. The binary coded output is supplied to a counter circuit which generates count data representing the number of tracks traversed by the objective lens or optical pick-up, which represents the distance travelled by the optical pick-up or objective lens. In this way, it is always possible to determine the distance travelled by the optical pick-up or objective lens.

However, the tracking signal inevitably picks up a D.C. component when the optical pick-up or objective lens traverses tracks on the disc. Further, when either or both of them are caused to vibrate by some external phenomena, it is likely to deviate from the center of the optical axis of a laser beam. In the event of this occurring, the tracking signal will have an asymmetrical waveform. The result is that binary coded values gained can be inaccurate because of the asymmetry of the tracking signal. Therefore, precise count data cannot be derived by the counter, making it impossible to precisely determine where the optical pick-up or objective lens is located after the movement thereof has begun.

SUMMARY OF THE INVENTION

An object of this invention is to provide an optical apparatus which can determine the exact travel distance of an optical pick-up or objective lens in relation to a track access operation, and thus can have exact access to a desired track.

This object can be attained by an optical apparatus for focusing a light beam onto an object, the object having a preformed track for guiding the light beam, comprising means for directing the light beam onto the object, means for detecting the light beam from the object so as to generate a tracking signal representing a location of the light beam with respect to the track of the object, the tracking signal having a DC signal component and an AC signal component, means for blocking the output of the DC signal component and permitting the output of the AC signal component, and means for adjusting the location of the directing means with respect to the track of the object in accordance with the AC signal output from the permitting means.

BRIEF DESCRIPTION OF THE DRAWINGS

The foregoing aspects and other features of the invention are explained in the following description taken in conjunction with the accompanying drawings wherein.

FIG. is a schematic block diagram of an optical information reproducing apparatus in which an optical apparatus of this invention is used.

DETAILED DESCRIPTION OF THE PREFERRED EMBODIMENT

There will now be described an embodiment of this invention with reference to the accompanying drawings.

Figure 5:
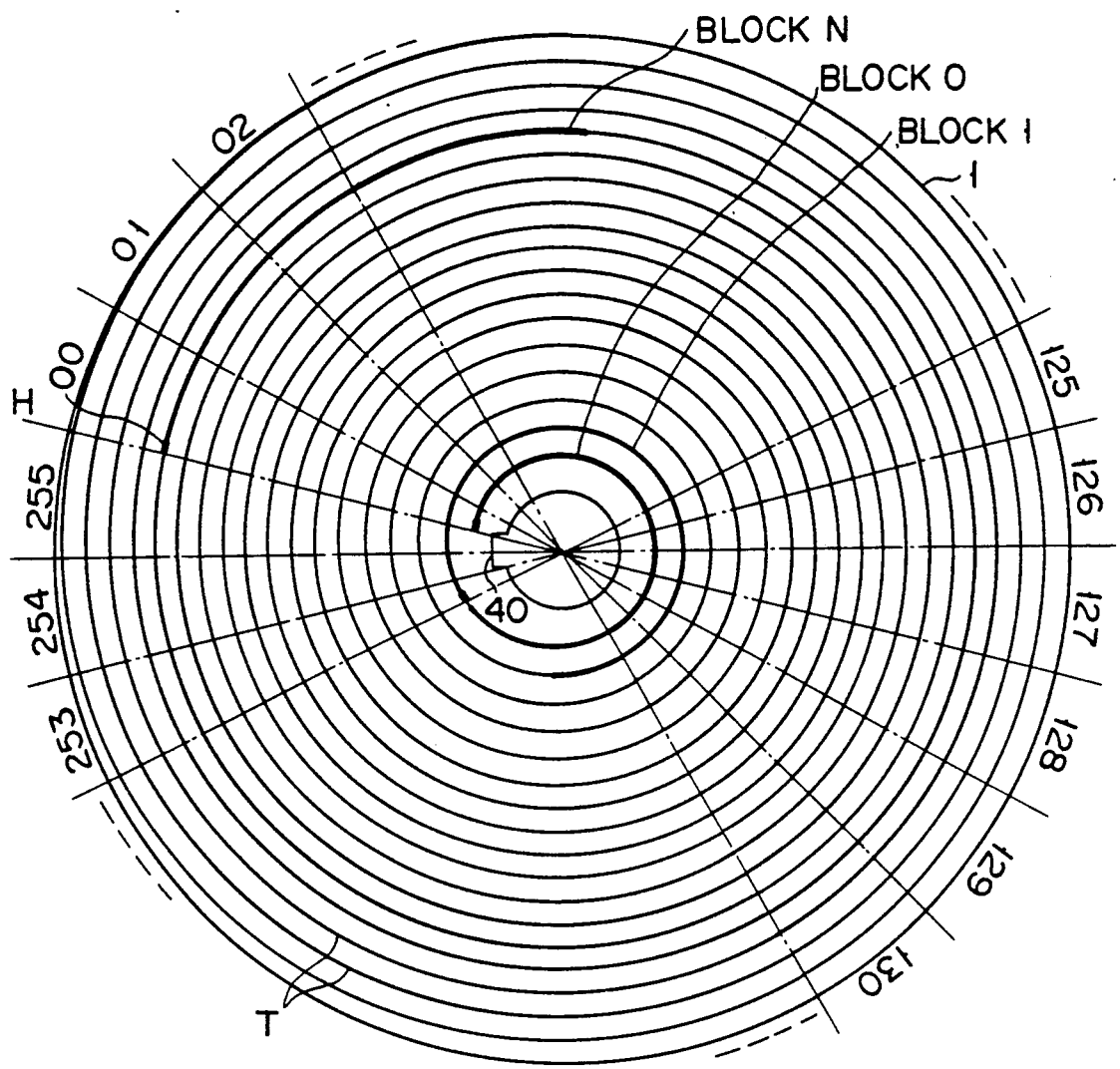
FIG. 5 shows an optical disc surface on which data in the form of pits is recorded.

FIG. 5 shows the surface of optical disk 1. A plurality of tracks T are formed spirally on the surface of optical disc 1 used as a medium for recording information. A number of grooves called pits are made on each of the tracks. Optical disk 1 comprises a disk-like base formed of glass or plastic, and a metal coating (such as tellurium or bismuth coating) coated on the disk-like base in a doughnut-like shape. Optical disk 1 has reference position mark 40 as a notch portion formed near the central portion of the metal coating. The surface of optical disk 1 is divided into a plurality of sectors, "00" to "255", with reference position mark 40 as "00". Each track is divided into blocks each of which has block header H at its start position. Optical disc 1 is rotated at a constant speed, for example, by motor 2 which is controlled by means of motor controller 18. Information from optical disc 1 is reproduced by means of optical pick-up 3. A linear motor 13 is connected to linear motor controller 17 and linear motor position detector 26 is also connected to linear motor controller 17. Optical scale 25 is connected to optical pick-up 3 and can be moved with optical pick-up 3. Linear motor position detector 26 detects moving optical scale 25 and generates a position signal corresponding to the amount of the movement of optical scale 25. The fixed portion of linear motor 13 includes a permanent magnet (not shown). Linear motor 13 is excited by means of linear motor controller 17 so as to permit optical pick-up 3 to move in a radial direction of optical disc 1. Optical pick-up 3 comprises objective lens 6, beam splitter 11b, half prism 11c, collimator lens 11a, condenser lens 10, condenser lens 11d, knife edge 12, a pair of focus position sensors 7, semiconductor laser 9, driving coils 4 and 5, and a pair of photosensors PD1 and PD2.

Further, objective lens 6 is held in the optical pick-up by means of a leaf spring (not shown). Objective lens 6 can be moved in a focusing direction (axial direction of the lens) by means of driving coil 5 and in a tracking direction (which is perpendicular to the axis of the lens 6) by means of driving coil 4.

When information is recorded or reproduced, semiconductor laser 9 is activated by means of laser controller 14. A light beam output from laser 9 is directed to collimator lens 11a for collimation. Beam splitter 11b serves to split the collimated light beam and send part of it toward objective lens 6. Objective lens 6 focuses on a desired track on optical disk 1. Light reflected from the track on optical disc 1 is directed to half prism 11c via objective lens 6 and beam splitter 11b, which serves to split the reflected light into two components. One of the components separated by half prism 11c is led to a pair of photosensors PD1 and PD2 via condenser lens 10 for converting to electrical signals. The other component is led to a pair of focus position sensors 7 via condenser lens 11d and knife edge 12.

Focus position sensor 7 produces an output signal corresponding to the position at which the laser beam is focused. The output signal is supplied as a focus error signal to focusing controller 15 via operational amplifier OP2. Focusing controller 15 supplies a voltage corresponding to the received focus error signal to focusing driving coil 5 via amplifier 28.

Two electrical signals output from photosensors PD1 and PD2 are supplied to operational amplifier OP1, which generates a tracking signal by subtracking one signal of the two electrical slignals from the other. This tracking signal includes information about the location of a light beam with respect to a track on optical disk 1.

Figure 3:
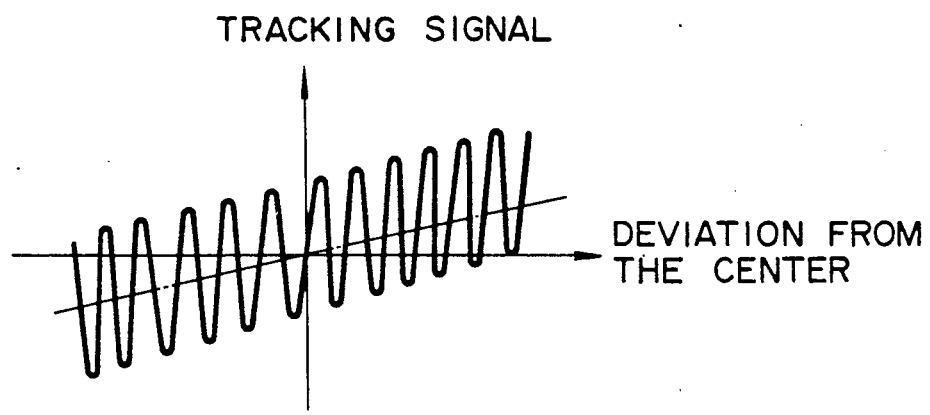
FIG. 3 shows a tracking signal obtained when an optical pick-up or objective lens deviates.
Figure 6:
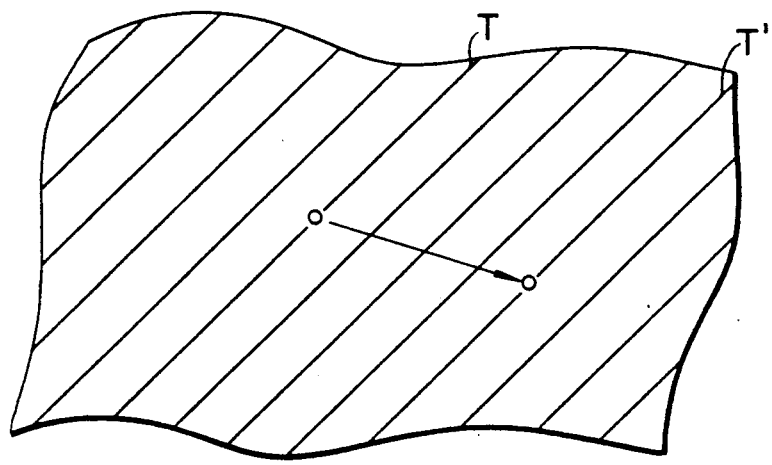
FIG. 6 is a partly enlarged view of FIG. 5 to show a shift of the spot of a laser beam.

The tracking signal generated during access of optical pick-up 3 or objective lens 6 has a DC component and an AC component (as a normal component) and will have a waveform such as is shown in FIG. 3 when both or either of them vibrates by some external phenomena. In this case, the spot of the light beam will shift, for example, from track T to track T' (FIG. 6).

At tracking controller 16, the tracking signal is supplied as a tracking control signal to driving coil 4 via amplifier 27, thus permitting objective lens 6 to be moved. The tracking control signal is also supplied to linear motor controller 17.

Further, the two output signals are supplied as reproduction signals to video circuit 19 which in turn converts the reproduction signal to a binary coded digital signal so as to reproduce the image information recorded on optical disc 1.

Laser controller 14, focusing controller 15, tracking controller 16, linear motor controller 17, motor controller 18 and video circuit 19 are all connected to CPU 23 via bus line 20. CPU 23 executes a preset program stored in memory 24 in response to instructions supplied from operating panel 30 to supply control signals to corresponding portions. A/D converter 21 is used to make it possible to transfer information between focusing control circuit 15 and CPU 23. D/A converter 22 is used to permit information transfer between CPU 23 and each of tracking controller 16 and linear motor controller 17.

Figure 2:
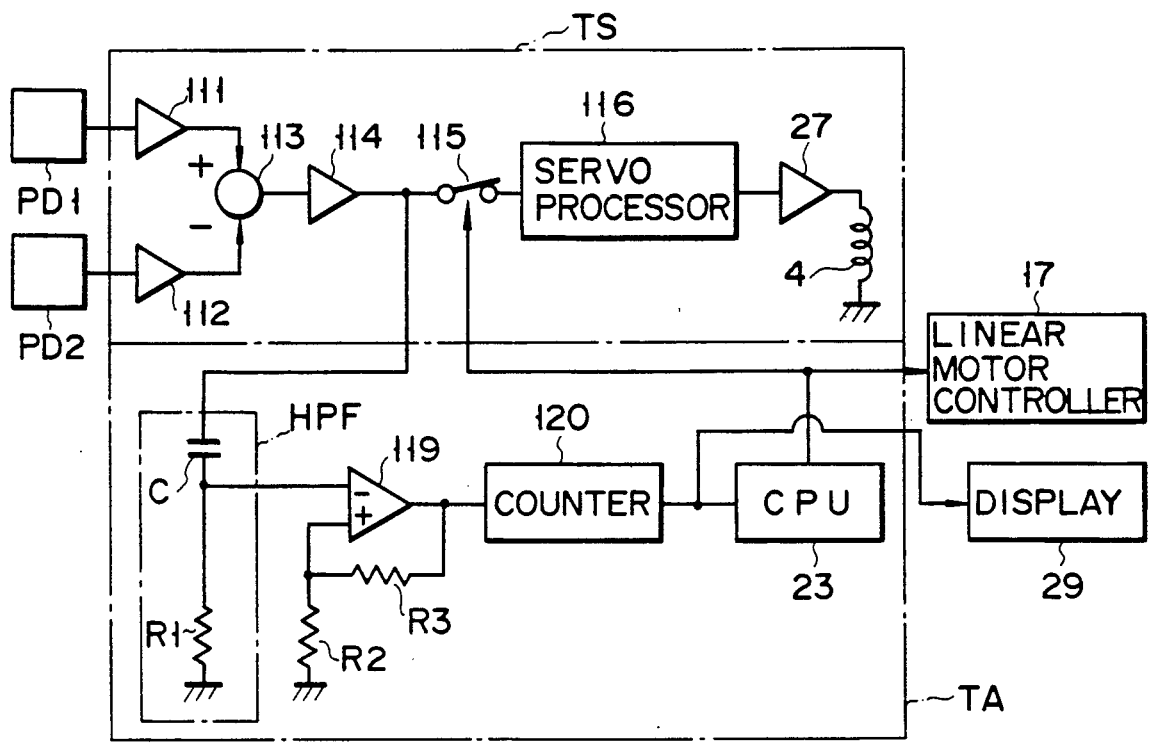
FIG. 2 is a detailed diagram of the optical apparatus shown in FIG. 1 including a tracking servo circuit and a track access circuit.

FIG. 2 shows a block diagram of the optical apparatus of FIG. 1 consisting of tracking servo circuit TS and track access circuit TA. The reflected light from optical disc 1 is transmitted to photosensors PD1 and PD2 via the optical pick-up 3 including objective lens 6. Two output signals from photosensors PD1 and PD2 are supplied to subtracter circuit 113, which is the equivalent of OP1 shown in FIG. 1 via amplifier 111 and 112, respectively. Subtracter circuit 113 derives out a difference between the output signals, and generates the subtraction result as a tracking signal. Then, the tracking signal is supplied to servo processor 116 via amplifier 114 and switching circuit 115 which is normally set in the ON state. Servo processor 116 generates a drive signal in response to the tracking signal to drive driving coil 4 which is connected thereto via amplifier 27. The drive signal is supplied to driving coil 4 via amplifier 27 to cause an electromagnetic force to be generated in driving coil 4, permitting objective lens 6 to be movable. Therefore, it is possible to adjust the location of objective lens 6 with respect to a track on the optical disk 1.

Assume now that a desired track is accessed by moving the entire optical pick-up 3 shown in FIG. 1 along the surface of the optical disc 1. In this case, switching circuit 115 is turned off in response to a control signal from CPU 23, thus separating servo processor 116 from other circuits.

As is clearly understood from the circuit construction of FIG. 2, a tracking signal from subtracter circuit 113 is supplied to track access circuit TA whether switching circuit 115 is ON or OFF. In track access circuit TA, the tracking signal, which includes a DC signal component and an AC signal component, is first supplied via amplifier 114 to high-pass filter HPF having capacitor C and resistor R1 and connected to comparator circuit 119. High-pass filter HPF is used to block a low frequency component including the DC component and permit the AC component as a normal component.

Figure 4A:
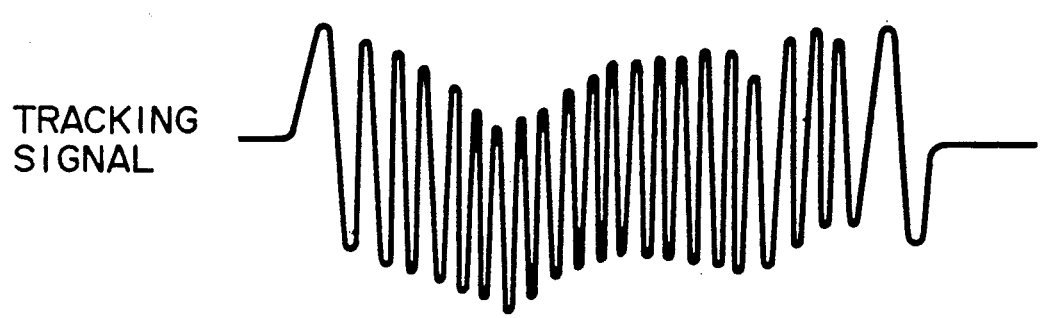
FIGS. 4A and 4B show two tracking signals; the upper one is not processed by HPF while the lower one processed by HPF.
Figure 4B:
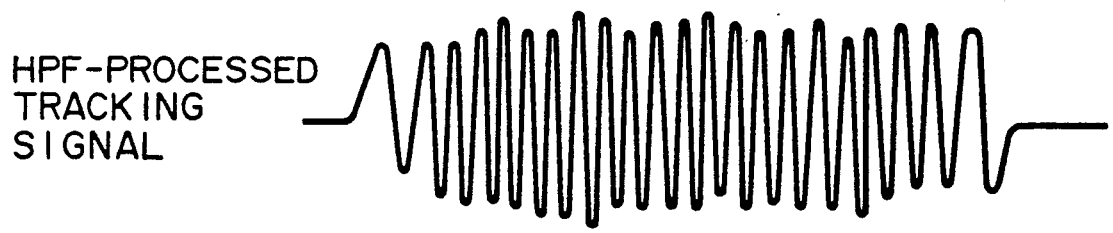

Without passing through high-pass filter HPF, the tracking signal will have a waveform such as is shown in FIG. 4A. The waveform has an asymmetrical form because it includes a DC component. On the other hand, the signal processed by HPF is approximately symmetric and has a waveform such as is shown in FIG. 4B.

Cut-off frequency fc of high-pass filter HPF is set higher than inherent vibration frequency f0 of driving coil 4 which is, for example, 50 Hz and lower than a frequency at which the tracks are traversed by objective lens 6 in order to compensate for vibration of objective lens 6 caused by some external phenomena. When f0 is set at 50 Hz, cut-off frequency fc can be derived as follows. In a case where an impulse is applied to objective lens 6 in the access operation of the objective lens 6 to a desired track, the vibration amplitude becomes maximum at f0=50 Hz. Suppose that, at this time, the objective lens 6 vibrates with an amplitude of 50 μm. Further, assume that the tracking signal is shifted by 10% of the amplitude because of the vibration, and that it is intended to suppress the influence to within 1% thereof. In this case, high-pass filter HPF will be designed to attenuate the amplitude to one-tenth at 50 Hz, and therefore cut-off frequency fc is set at 500 Hz.

Since time constant $\tau c = \frac{1}{2}\pi fc$, $\tau c$ is 0.32 ms. Since $\tau c$ equals CR, R can be set 32 KΩ when C is set at 0.01 μF, for example. Therefore, using high-pass filter HPF the D.C. signal component can be eliminated from the tracking signal. The filtered tracking signal is sent to comparator circuit 119 having inverting and non-inverting input terminals. The non-inverting input terminal is grounded via resistor R2 and connected to an output terminal of comparator 119 via resistor R3. An optimum hysteresis can be set by setting the resistances of resistors R2 and R3 to suitable values. Setting of the optimum hysteresis can prevent the tracking signal to be erroneously converted to a binary coded value because of noise mixed in the tracking signal.

A signal converted into a binary form by comparator circuit 119 is counted by counter 120. The count output of counter 120 is supplied to CPU 23. Then, CPU 23 determines, based on the count output, the number of tracks traversed by objective lens 6 or optical pick-up 3 shown in FIG. 1. In this way, the travel distance of optical pick-up 3 or objective lens 6 can be known. It is also possible to display the count output of counter circuit 120 on display 29.

Three track access methods are possible.

The first method is to move the entire optical pick-up 3 so as to have access to a desired track position; the second method is to move only objective lens 6 without moving optical pick-up 3 so as to jump a plurality of tracks at one time; and the third method is to move objective lens 6 so as to jump the track one by one and have access to a preset track position. In each method, the number of tracks traversed by optical pick-up 3 or objective lens 6 in the access operation is counted by counter circuit 120 whether optical pick-up 3 or objective lens 6 is moved. In this fashion, the travel distance of optical pick-up 3 or objective lens 6 can be known.

Thus, with the optical apparatus of this invention having high-pass filter HPF, it becomes possible to eliminate a low frequency component including the D.C. component and the like from the tracking signal. Therefore, influence of vibration of objective lens 6 or optical pick-up 3 caused by disturbance occurring during the movement of optical pick-up 3 or objective lens 6 can be suppressed to a minimum. Thus, since a correct count can be derived without causing erroneous binary conversion, optical pick-up 3 or objective lens 6 has access precisely to a desired track.

It should be understood that while the present invention was described in connection with one specific embodiment, other modification will become more apparent to one skilled in the art upon a study of the specification, drawings and following claims.

What is claimed is:

1. A track accessing apparatus for a light beam for an optical disk having an information recording track, comprising:
    means for directing the light beam onto the optical disk, said directing means including an objective lens driving coil having an inherent vibrating frequency;
    means for detecting a reflection of the light beam from the optical disk and for generating a tracking signal including a track detection alternating signal and a low frequency component having a frequency lower than that of the track detection alternating signal, the alternations of said track detection alternating signal being representative of the frequency at which tracks are traversed by the light beam;
    high-pass filter means for removing the low frequency component of the tracking signal, said high-pass filter means having a cut-off frequency than said inherent vibrating frequency and lower than a frequency at which tracks are traversed by the light beam;
    means for counting a number of alternation of the track detection alternating signal; and
    means for moving the light beam directing means across the tracks according to the number of alternations counted by said counting means.

2. A track accessing control apparatus according to claim 1, wherein said high-pass filter means includes capacitor means for determining the cut-off frequency.

3. A track accessing control apparatus according to claim 1, wherein said high-pass filter means includes resistor means for determining the cut-off frequency.

4. A track accessing control apparatus according to claim 1, wherein said counting means includes means for comparing a level of an output of said high-pass filter means with a reference level; and means for counting an output of said comparing means.

5. A track accessing control apparatus according to claim 1, wherein said apparatus further comprises display means, operatively coupled to receive a counting result of said counting means, for displaying the number of alternations of said track detection alternating signal.

* * * * *

UNITED STATES PATENT AND TRADEMARK OFFICE
CERTIFICATE OF CORRECTION

PATENT NO. : 5,051,972
DATED : September 24, 1991
INVENTOR(S) : Mikio Yamamuro

It is certified that error appears in the above-indentified patent and that said Letters Patent is hereby corrected as shown below:

On the Title page, item [57] Abstract, col. 2, line 1, change "tracking" to --track--.

On the Title page, item [57] Abstract, col. 2, line 11, change "if" to --is--

Claim 1, column 6, line 20, after "accessing" insert --control--

Claim 1, column 6, line 38, after "frequency" insert --higher--

Claim 1, column 6, line 42, change "alternation" to --alternations--

Signed and Sealed this

Twenty-eighth Day of September, 1993

Attest:

BRUCE LEHMAN

*Attesting Officer*  *Commissioner of Patents and Trademarks*